(12) United States Patent
O'Shea et al.

(10) Patent No.: US 7,853,477 B2
(45) Date of Patent: Dec. 14, 2010

(54) RF-BASED ELECTRONIC SYSTEM AND METHOD FOR AUTOMATIC CROSS-MARKETING PROMOTIONAL OFFERS AND CHECK-OUTS

(76) Inventors: Michael D. O'Shea, 711 Wilderness Ct., Neenah, WI (US) 54956; Gregory Benrud, 2415 Maple Grove Dr., Neenah, WI (US) 54956; John A. Anderla, 94 Estherbrook Ct., Appleton, WI (US) 54915; Ivan Schrodt, W4912 Palisades Trail, Sherwood, WI (US) 54169

( * ) Notice: Subject to any disclaimer, the term of this patent is extended or adjusted under 35 U.S.C. 154(b) by 2395 days.

(21) Appl. No.: 10/748,763

(22) Filed: Dec. 30, 2003

(65) Prior Publication Data
US 2005/0149391 A1 Jul. 7, 2005

(51) Int. Cl.
G06Q 30/00 (2006.01)
(52) U.S. Cl. ............................. 705/14; 705/16; 705/21
(58) Field of Classification Search .................. 705/14.1
See application file for complete search history.

(56) References Cited

U.S. PATENT DOCUMENTS

| | | | |
|---|---|---|---|
| 4,656,463 A | | 4/1987 | Anders et al. |
| 4,929,819 A | * | 5/1990 | Collins, Jr. .................. 235/383 |
| 5,047,614 A | | 9/1991 | Bianco |
| 5,164,707 A | | 11/1992 | Rasmussen et al. |
| 5,173,851 A | | 12/1992 | Off et al. |
| 5,250,789 A | * | 10/1993 | Johnsen ........................ 705/14 |
| 5,361,070 A | | 11/1994 | McEwan |
| 5,380,991 A | | 1/1995 | Valencia et al. |
| 5,485,006 A | * | 1/1996 | Allen et al. .............. 250/222.1 |
| 5,596,493 A | | 1/1997 | Tone et al. |
| 5,677,927 A | | 10/1997 | Fullerton et al. |
| 5,687,169 A | | 11/1997 | Fullerton |
| 5,691,684 A | * | 11/1997 | Murrah ........................ 235/385 |
| 5,711,160 A | | 1/1998 | Namisniak et al. |

(Continued)

FOREIGN PATENT DOCUMENTS

DE 29714999 11/1997

(Continued)

OTHER PUBLICATIONS

Advertisement—www.mobilecloak.com—mCloak—RFID Tolltags etc., Copyrighted—2002.

(Continued)

*Primary Examiner*—C. M Tarae
*Assistant Examiner*—Marilyn Macasiano
(74) *Attorney, Agent, or Firm*—Perkins Coie LLP

(57) ABSTRACT

A method and apparatus for providing cross-marketing and promotional offers to a customer using an electronic tag product identification system is disclosed. The disclosed technology also allows for presenting promotional offers in an automatic check-out process. RFID smart tags are associated with products in a place of purchase or a place of selection of such products. Each distinct product is associated with at least one smart tag, the smart tags containing identification information regarding their respective products. RFID smart tag readers are used to retrieve product information including information concerning promotional offers, purchase prices and expected product weights. Such promotional offers are presented to the customer and may be real-time promotional offers, near real-time promotional offers or generic promotional offers.

26 Claims, 7 Drawing Sheets

U.S. PATENT DOCUMENTS

| | | | |
|---|---|---|---|
| 5,727,153 A | | 3/1998 | Powell |
| 5,798,694 A | | 8/1998 | Reber et al. |
| 5,821,512 A | * | 10/1998 | O'Hagan et al. ............ 235/383 |
| 5,832,035 A | | 11/1998 | Fullerton |
| 5,918,211 A | * | 6/1999 | Sloane ........................ 705/16 |
| 5,942,977 A | | 8/1999 | Palmer et al. |
| 5,955,969 A | | 9/1999 | D'Hont |
| 5,979,757 A | * | 11/1999 | Tracy et al. ................. 235/383 |
| 5,990,794 A | | 11/1999 | Alicot et al. |
| 6,037,879 A | | 3/2000 | Tuttle |
| 6,119,935 A | * | 9/2000 | Jelen et al. .................. 235/383 |
| 6,168,079 B1 | * | 1/2001 | Becker et al. ............... 235/383 |
| 6,177,903 B1 | | 1/2001 | Fullerton et al. |
| 6,195,006 B1 | | 2/2001 | Bowers et al. |
| 6,218,979 B1 | | 4/2001 | Barnes et al. |
| 6,226,619 B1 | | 5/2001 | Halperin et al. |
| 6,249,227 B1 | | 6/2001 | Brady et al. |
| 6,294,997 B1 | | 9/2001 | Paratore et al. |
| 6,354,493 B1 | | 3/2002 | Mon |
| 6,386,450 B1 | | 5/2002 | Ogasawara |
| 6,407,665 B2 | | 6/2002 | Maloney |
| 6,409,086 B1 | | 6/2002 | Pellauumail et al. |
| 6,429,768 B1 | | 8/2002 | Flick |
| 6,435,407 B1 | | 8/2002 | Fiodelisi |
| 6,446,049 B1 | | 9/2002 | Janning et al. |
| 6,451,154 B1 | | 9/2002 | Grabau et al. |
| 6,484,939 B1 | * | 11/2002 | Blaeuer ...................... 235/383 |
| 6,491,217 B2 | | 12/2002 | Catan |
| 6,497,656 B1 | | 12/2002 | Evans et al. |
| 6,507,279 B2 | | 1/2003 | Loof |
| 6,587,835 B1 | | 7/2003 | Treyz et al. |
| 6,640,214 B1 | | 10/2003 | Nambudiri et al. |
| 6,693,511 B1 | | 2/2004 | Seal |
| 6,693,539 B2 | | 2/2004 | Bowers et al. |
| 6,694,177 B2 | | 2/2004 | Eggers et al. |
| 6,707,376 B1 | | 3/2004 | Patterson et al. |
| 6,707,381 B1 | | 3/2004 | Maloney |
| 2002/0040321 A1 | | 4/2002 | Nicholson |
| 2002/0050526 A1 | * | 5/2002 | Swartz et al. .......... 235/472.02 |
| 2002/0077906 A1 | | 6/2002 | Remler |
| 2002/0099610 A1 | * | 7/2002 | Marion ........................ 705/21 |
| 2002/0152119 A1 | | 10/2002 | Kepros et al. |
| 2003/0036957 A1 | | 2/2003 | Nguyen |

FOREIGN PATENT DOCUMENTS

| | | | |
|---|---|---|---|
| DE | 19742126 | | 3/1999 |
| GB | 2193000 A | * | 1/1988 |
| WO | 0068851 | | 11/2000 |
| WO | 0169429 A2 | | 9/2001 |
| WO | 0215073 A1 | | 2/2002 |
| WO | 0248955 A1 | | 6/2002 |
| WO | 0208006 A1 | | 10/2002 |
| WO | 0065532 A1 | | 11/2002 |

OTHER PUBLICATIONS

Advertisement—www.mobilecloak.com—RFID Tags, Copyrighted—2002.
Ultra-Wideband Technology for Short- or Medium-Range Wireless Communications, Copyrighted—2001 Intel Corporation.
Ultra Wideband: The Ultimate Disruptive Technology, www.ultrawidebandplanet.com—Jun. 11, 2002—INT Media Group.
U.S. Approves Ultra-Wideband Technology, www.wirelessnewsfactor.com—Feb. 15, 2002.
New Public Safety Applications and Broadband Internet Access Among Uses Envisioned by FCC Authorization of Ultra-Wideband Technology, Federal Communications Commission—Feb. 14, 2002.
Ultra Wideband—searchnetworking.com, Copyrighted 2000-2002—Techtarget.
Internet Article—www.timedomain.com—PulsON Technology Capabilities, Sep. 3, 2002.
White Paper—Integration of Auto-ID Tagging System With Holonic Manufacturing Systems—Cambridge University Auto-ID Center, Published—Sep. 1, 2001.
Auburn University—Detection & Food Safety Center—audfs.eng.auburn.edu, Sep. 4, 2002.
Internet Article—Smart Tags Indicate Freshness—courses.che.umn.edu, Sep. 4, 2002.
Internet Article—www.aimglobal.org—Pharmaceutical Distributor Cuts Day of Safety Stock, Aug. 29, 2002.
Internet Article—www.idtechex.com—Independent Market, Strategic and Technology Reports, Aug. 29, 2002.
Internet Article—www.readymealsinfo.com—M&S Pilots RFID System for Fresh Food Operation, Sep. 4, 2002.
Internet Article—audfs.eng.auburn.edu—Auburn University Detection & Food Safety Center, Sep. 4, 2002.
RFID Journal—Internet Article—www.rfidjournalcom—Auto-ID Center Opens Demonstration Lab in U.K., Sep. 4, 2002.
Internet Article—www.autoidcenter.org—Transmitting ePC Codes, Aug. 26, 2002.
Internet Article—www.electronicidinc.com—Destron-Fearing Electronic ID Background, Sep. 4, 2002.
Internet Article—destronfearing.com—Applications-Companion Animals, Sep. 4, 2002.
Internet Article—audfs.eng.auburn.edu—Auburn University—Detection & Food Safety Center, Sep. 4, 2002.
Internet Article—sfgate.com—Shops Try Chips for Tracking Every Move by Client 'Tribe' Monitoring Systems Note What Catches Customers' Eyes, Aug. 6, 2002.
Internet Article—www.aimglobal.org—Radio Frequency Identification—RFID A Basic Primer, Aug. 28, 1999.
Internet Article—www.aimglobal.org—Common Applications—RFID, Jul. 23, 2002.
Internet Article—www.usatoday.com—New Chips Could Make Everyday Items 'Talk', Jul. 23, 2002.
Forbes Magazine—The Internet of Things, Mar. 18, 2002.
Auto-ID Center—Institute for Manufacturing, University of Cambridge—White Paper—Auto-ID Based Control —An Overview, Feb. 1, 2002.
Wireless Handhelds—Beam Up Some Information, Scotty, Control Engineering, May 2002.
Scientific American—Wireless Data Blaster, May 2002.
Auto-ID Center, Institute for Manufacturing, University of Cambridge, White Paper—The Intelligent Product Driven Supply Chain, Feb. 1, 2002.
Auto-ID Center Massachusetts Institute of Technology—White Paper—Smart Medicine—The Application of Auto-ID Technology to Healthcare, Feb. 1, 2002.
"Theory, History, and the Advancement of Parametric Loudspeakers: A Technology Overview", by James J. Croft and Joseph O. Norris, Revision D, American Technology Corporation, San Diego, CA 2002. Available at http://www.atcsd.com/pdf/HSSWHTPAPER-RevE.pdf.
Popular Science, What's New, Suzanne Kantra Kirschner, We've heard hypersonic sound. It could change everything. Exemplary applications of hypersonic technology are illustrated at www.popsci.com/popsci/hometech/article/0.12543.351353.00.html.
D. McFarlane, "Auto-ID Based Control," White Paper for the Auto-ID Centre Institute for Manufacturing, University of Cambridge, Cambridge, United Kingdom, Feb. 1, 2002. Available at http//www.autoidcenter.org/research/CAM-AUTOID-WH-004.pdf.
Wincor Nixdorf, Member of METRO Group, Future Store Initiative, "Store Vision—High-Tech for the Future in Retail," Wincor Vision May 2003. Available at http:/www.wincor-nixdor.com/internet/com/Idustries/Retail/WincorVision/WincorVisionSpezialFSI.templateId=blob.jsp.property=Data.pdf.
AMSKAN Editorials, RFID Overview: The science of evaluating RFID (Radio Frequency Identification) Technology, AMSKAN Update: Jan. 1999. Available at www.amskan.com/html/rfid_overview.html.
Ludwig Weimann and Junru Wu Transdermal Drug Delivery by Sono-Macroporation http://ultra-sonictechnologies.com/cancun-presentation.htm Nov. 4, 2003 11:28:14 AM.
U.S. Appl. No. 10/748,691, filed Dec. 30, 2003.
U.S. Appl. No. 10/748,118, filed Dec. 30, 2003.
U.S. Appl. No. 10/748,455, filed Dec. 30, 2003.

* cited by examiner

RF-BASED ELECTRONIC SYSTEM AND METHOD FOR AUTOMATIC CROSS-MARKETING PROMOTIONAL OFFERS AND CHECK-OUTS

TECHNICAL FIELD OF THE INVENTION

The present invention relates to a system and method for providing cross-marketing and promotional offers to a customer using radio frequency based product identification systems.

BACKGROUND

Supply Chain Management (SCM) is a common problem for any organization involved in the design, manufacture and distribution of goods. SCM is particularly important in retail organizations where the successful management of product inventory and the promotion of customer satisfaction are essential for efficient operation, customer loyalty, and optimal profit margins. Common SCM activities for product manufacturers as well as retailers include inventory control, supplier network development, purchasing and marketing.

One of the goals of marketing is to continually enhance customer satisfaction. To enhance customer satisfaction, many retail operations support various manufacturer sponsored promotional offers to customers. Additionally, a retailer may offer its own promotional offers. Many such promotional offers are presented to customers via discount coupons that are redeemable at the point of sale. Coupon promotional offers are well known and normally offer a discount for purchasing a product.

A similar type of coupon based promotional offer relates to cross-marketing coupons. A manufacturer may issue a cross-marketing coupon in which the purchase of a first product triggers a discount coupon offer for purchasing a second product. Such second product may be a different product (different from the first product) produced by the same manufacturer or for a different product produced by a second manufacturer. A cross-marketing offer is typically for products that are commonly used at the same time (e.g., baby wipes and diapers). Cross-marketing coupons may also be used to promote a customer's "trial use" of an entirely new product or a new and improved version of an existing product.

Prior art cross-marketing coupon systems typically print cross-marketing coupons directly on a product package or enclosed the coupon within the product package. Such prior art systems exhibit several inherent limitations that adversely affect the effectiveness of cross-marketing promotional offers.

First, cross-marketing coupons are generally special promotional events valid only for a predetermined length of time and may be intended for distribution to a specific retailer or retailers. Consequently, a manufacturer must interrupt a production line to print retailer specific cross-marketing coupons on the product package or product documentation and then segregate that product from the rest of the product inventory. The additional coupon-printing step and segregation (e.g., special handling and distribution) of the promotional product from the rest of the product inventory adds additional cost to the product, is time consuming and requires substantial lead time for the manufacturer to offer such a promotional event.

Second, printing cross-marketing coupons directly on a product package or enclosing the coupon within the product package increases customer inconvenience. Such prior art cross-marketing coupon systems would typically require a customer to purchase (perhaps even consume) a "cross-marketing coupon triggering product" before such customer can remove and use the coupon. Such a system would typically require a customer to use a cross-marketing coupon at a later date. Therefore, a customer must both clip coupons and keep track of the clipped coupons until a later time when such coupons are used. Such customer inconveniences reduce the effectiveness of cross-marketing coupon offers as many customers will likely choose not use the coupon at all.

Third, prior art coupon systems result in longer average check-out times which can contribute to longer check-out lines. Many prior art coupon redemption processes implemented at a point-of-sale (e.g., scanning a product bar code at the check-out counter) are unnecessarily time consuming in today's electronic world. Additionally, customers will almost always resent long check-out lines and may base their future patronage decisions at least in part on memories of long check-out lines. Consequently, promotional offers that result in longer check-out lines have the potential to actually discourage customer patronage.

Fourth, prior art coupon systems (i.e., paper-based coupons) require a retailer to collect the coupons and then send them to a clearinghouse, which is typically an independent company used by a retailer to sort, count, and submit coupons for payment to manufacturers or their agents on behalf of the retailer. Further, the manufacturer must pay the clearinghouse and the retailer for their role in handling and processing the redeemed coupons. Clearly all costs relating to a coupon program must be considered by the coupon offering party when determining the amount of a coupon offer. Restated, the coupon processing overhead costs will be determined and such costs will reduce the amount of "savings" offered to a customer thereby indirectly passing such processing costs to the customer.

Fifth, the previously described prior art systems have limited ability to influence a shopper at the point of a purchasing decision, or simply, the point of decision. The point of decision is generally defined as the moment a customer makes a purchasing decision. The point of decision would typically occur, for example, while a shopper is walking through a retailer store examining products. Retailers and manufacturers have long known the importance of the influencing shoppers at the point of decision; however, their efforts to influence a shopper at the point of decision have largely been limited to markings on product package, such as witty slogans or eye catching color schemes and gimmicks such as "blue light special" programs. The above described prior art system of printing cross-marketing promotional offerings on a product's packaging or coupons included inside a product's packaging have limited ability to influence a shopper at the point of decision.

An alternative to traditional coupons printed on, or enclosed in, a product are electronic coupons. One such system is described in U.S. Pat. No. 5,727,153, issued to Ken R. Powell, and such reference is hereby incorporated for all purposes. Powell U.S. Pat. No. 5,727,153 describes a system for creating, dispensing, and redeeming electronic discount coupons in a store. The system includes a "smart card," product stations adjacent to selected products in the store and a check-out station. To create an electronic coupon, the customer inserts the card into the product station adjacent to the product the customer wishes to purchase, and the product station then writes an electronic coupon onto the card. The customer continues to shop throughout the store, collecting electronic coupons for products of interest. Upon completing his or her shopping, the customer redeems the electronic coupons at the check-out area by inserting the card into the check-out station. If the product code data (e.g., the Universal Product Code, or UPC) on the product matches data stored on the card, the customer receives the discount. Periodically, the electronic coupon data is transferred to a remote clearing house.

One limitation of the Powell U.S. Pat. No. 5,727,153 electronic coupon system, however, relates to the "smart card" feature. Using the Powell '153 system, a customer must have in his or her possession a smart card and must repeatedly "scan" the smart card in order to collect and qualify for discount offers. The customer may misplace such card while on a shopping trip. In addition, a customer may not take the time to repeatedly scan the card or may simply forget to scan the card. Further, the Powell '153 electronic coupon system does not provide for cross-marketing offers.

Therefore a need exists for a cross-marketing promotional process that does any one of the following: (1) provides more flexibility in creating promotional offers by substantially reducing or eliminating the lead time required for a manufacturer to offer a promotional event; (2) provides for "after shipping" cross-marketing promotional offer (i.e. a promotional offer that is conceived and offered after the product is shipped); (3) provides for a cross-marketing promotional process that is more cost-efficient; (4) that minimizes or eliminates customer inconveniences such as longer check-out times, coupon clipping and the necessity to return to the store to use cross-marketing coupons; and (5) provides an improved method for influencing a shopper at the point of a purchasing decision.

SUMMARY

Objects and advantages of the invention will be set forth in the following description, or may be obvious from the description, or may be learned through practice of the invention.

The present invention relates to novel implementations of Radio Frequency (RF) based product identification technology and electronic product identification codes, such as EPC codes, in a system and method for providing cross-marketing promotional offers to a customer as well as improved point-of-sale procedures.

Certain embodiments according to aspects of the present invention will provide significant improvements in promotional offering programs by lowering administrative costs, providing for real-time promotional offers that provide a more dynamic influence on a customer at the point of a purchasing decision while minimizing customer inconvenience and point-of-sale check-out time requirements. One such exemplary embodiment according to aspects of the present invention relates generally to novel implementations of Radio Frequency Identification Device (RFID) technology to assist organizations with various aspects of providing promotional offers such as cross-marketing coupons. Such RFID based systems and methods provide retailers and manufacturers with the ability to issue cost efficient promotional offers to customers in real-time if desired.

Generally speaking, a "real-time" promotional offer is a promotional offer that may be triggered by a customer's shopping activity, and thus, may be a customer specific promotional offer. A "real-time" offer would typically be presented to such customer while engaging in such shopping activity. For example, if a customer is viewing product Y or places product Y in a shopping cart, using the disclosed technology a remote party (such as a manufacturer or retailer) may detect such customer activity and offer the customer a discount for purchasing product Z where such discount is conditional on a purchase of product Y. Real-time promotional offers would typically be presented to the customer before the customer ends his shopping experience and ideally at a "point of decision."

Radio Frequency Identification Devices and associated systems are well suited for SCM applications in general and promotional offering systems in particular. RFID systems may include low-cost, passive "smart" chips or "tags" that can be embedded in or attached to articles, products, and the like to convey information about the product via a scanner. Smart tags are generally small label-like devices with a micro-chip and a miniature embedded antenna. Such tags may be passive or active, the active tags requiring an internal power supply. A reader or scanner interrogates the smart tag with an electronic "trigger" signal. The smart tag in turn generates an electromagnetic pulse response that is readable by the scanner, the response containing the product information. RFID smart tags can be associated with a product by being embedded in or attached to product packaging, or incorporated directly into the product, and may convey conventional "bar code" information, as well as other more detailed information.

Such RFIDs and associated systems provide the ability to reliably and automatically obtain real-time product information for individual products throughout the supply chain. For example, RFID systems can provide retailers and manufactures real-time product information relating to products a customer is examining or has indicated an intention to purchase by placing such products in a shopping cart. Using RFID technology, retailers and manufacturers may provide real time product information and promotional offerings to a customer while the customer is shopping.

Exemplary embodiments of the disclosed methodology and system may include a manufacturer computer and database associated with a manufacturing location and a retailer computer and database associated with a particular retail store. The smart tags may be associated with a product at the manufacturing facility and coded with product information, such as the name of the product, type or category of product, manufacturer of the product, an electronic product code (EPC) and so forth. RFID Smart Tag Readers (STR) may be made available at various points along the supply chain in a number of conceivable scenarios according to the invention. Such RFID STR devices may be configured to interrogate RFID smart tags to obtain the information stored in such tags. The RFID STR devices may also be configured to use various techniques for ascertaining the RFID smart tag location. The RFID STR devices may then transfer such information to another electronic device, such as a computer. The electronic device may then use such product information to ascertain any promotional offers, such as cross-marketing coupons, that may be applicable to the product and transfer such information to a customer interface.

In one particular embodiment of the system and methodology according to the invention, the smart tags are associated with each distinct product, preferably at the place of manufacture. The smart tags may be in the form of adhesive labels or the like that may be attached directly to the product packaging, or to a separate container that holds the product. The RFID tagged products are then placed in customer display inventory locations. Exemplary customer display inventory locations include store shelves, refrigeration units, store cabinets, etc., wherever products are located for customer viewing. RFID tagged products may also be placed in retailer storage inventory locations. One well known exemplary retailer storage inventory location is the in-store stock room.

For this embodiment, at least one RFID STR device is provided in communication range of each distinct product.

For example, one RFID STR device can be moved throughout the retailer store covering all the customer display inventory locations and retailer storage inventory locations. Similarly, an array of RFID STR devices can be moved throughout the retailer store. In the alternative, an array of fixed RFID STR devices can be used. An RFID STR device may comprise a simple transmitter that transmits smart tag "trigger" signals. An RFID STR device may comprise both a transmitter for transmitting "trigger" signals and a receiver for detecting and receiving smart tag transmissions.

The RFID STR devices may be configured to communicate with a central computer and its associated hardware and software. Such a central computer is preferably located at the retailer store (retailer central computer) but may also be a customer interface or any other suitable electronic device used for data processing.

Additionally, an RFID STR device may be associated with a "smart cart." A "smart cart" is a container, such as a shopping cart, that incorporates an electronic computing device and may be used by a customer while shopping to store items the customer anticipates purchasing. Such a smart cart may comprise, for example, a computing device, a display, an RFID STR and a scale. Such devices may be individual components cooperatively connected through wired or wireless connections or integrated into a single electric device. For example, a smart cart computer, a smart cart display and a smart cart RFID STR may be integrated into a single electronic component and referred to collectively as a customer interface.

One exemplary embodiment of a customer interface is an electronic device comprising a processor, memory and an LCD screen and is preferably located on a shopping cart or other similar apparatus traditionally used by customers while shopping.

The customer interface is configured to receive a customer request for a desired product and transmit such request to a central computer. The central computer may then access an associated database for product information or request an RFID STR device to provide product information on the requested item. The central computer receives the product information from the RFID STR device (such as inventory count and product location) and transfers at least part of such information to the customer interface. Alternatively, the customer interface may communicate directly with the RFID STR device or an RFID STR device may be incorporated in the customer interface. Such product information may include information on promotional offers that may be related to items in said smart cart or items being viewed by a customer near said smart cart. With this configuration, the central computer (or smart cart computer) will automatically notify the customer of a qualifying promotional offer, such as a cross-marketing offer, and determine when the customer accepts such promotional offer and automatically process accepted promotional offers.

Another embodiment of the system and methodology according to the invention, relates to a smart cart using smart tag technology to facilitate automatic customer check-outs. Such a smart cart may include a customer-storage-area. Such customer-storage-area may be used to hold products while a customer is shopping. The smart cart further includes a smart-cart-scale. In one exemplary embodiment, such smart-cart-scale provides the surface upon which products are placed when in the customer-storage-area. The smart cart further includes an electronic tag reading device configured to retrieve product information from electronic tags associated with products. Such electronic tag reading device may be a simple reader that only receives electronic tag transmissions and does not transmit an electronic tag trigger signal. Alternatively, such electronic tag reading device may be configured to transmit an electronic tag trigger signal.

The electronic tag transmissions comprise product information associated with a "hot-product." A "hot-product" is a product that a customer is presently examining or a product that a customer has placed in the customer-storage-area. The smart cart may be further configured to communicate with a remote computer and to retrieve supplemental-product-information associated with the hot-product. Such supplemental-product-information may be retrieved using the product information retrieved from the electronic tag associated with a hot-product. Generally speaking, supplemental-product-information is any information associated with a product that is not part of the product information stored in the product's electronic tag. Such supplemental-product-information may comprise, for example, cross-marketing promotional offers, expected product weight values, product descriptions, product location within the retailer store and other such information. Exemplary promotional information includes information relating to cross-marketing promotional offers wherein such offers may be real-time promotional offers or near real-time promotional offers. A near real-time promotional offer is a customer generic offer that was generated recently, perhaps at the beginning of the shopping day, but generally after a product has been shipped by a manufacturer to a retailer.

The smart cart computer is further configured to present product information and supplemental-product-information to the customer. Ideally, the smart cart computer is in wired or wireless communication with the smart-cart-scale. Suitable wireless technologies are well known in the art and include Wi-Fi (wireless fidelity) and Bluetooth. With such a configuration, the smart cart computer can obtain a total-measured-weight of the product or products on the smart-cart-scale and compare such total-measured-weight to the expected-total-weight. If the measured-weight is within a predefined weight-tolerance of the expected-weight, there is an increased confidence that all products on the smart-cart scale are associated with operable and correctly programmed electronic tags.

Still further embodiments of the present invention relate to methodologies for presenting customers with real-time and near real-time cross-marketing promotional offers. For this exemplary embodiment, electronic smart tags are associated with products. Such products may be placed in retailer display locations, such as customer display inventory locations. As customers are shopping in a retailer establishment, electronic tags associated with "hot-products" are scanned to retrieve the product information stored in such electronic tags. As mentioned above, hot-products are products being examined by a customer or products that have been placed in a customer-storage-area. The product information retrieved from the hot-products is then used to determine if there are any cross-marketing promotional incentives associates with the hot products related to the purchase of a second product. Next the customer is automatically notified of such cross-marketing promotional offers and offered an opportunity to accept such offer. When the customer arrives at a point of sale to purchase the hot-products (i.e. the customer checks-out), the appropriate check-out adjustments consistent with accepted promotional offers are automatically calculated. Such promotional offers may be transmitted to a customer-interface associated with a shopping cart where the offers are displayed for customer viewing. Promotional offers may also be presented to customer via a voice message using, for example, hypersonic technology. Such promotional offers may also be displayed on a display associated with a smart shelf where the promotional offer is displayed when a customer passes near a second product qualifying for a cross-marketing discount (as determined based on the products already in customer storage).

Yet another exemplary embodiment of the present invention relates to a method for automatic customer check-outs. For this method, electronic smart tags are associated with products and such products are placed in a retailer inventory location for customer viewing while shopping. Each distinct product is associated with at least one smart tag, where such smart tags contain product-information relating to their respective product. Next, the electronic tags associated with hot-products are scanned with an electronic tag scanner to retrieve product information relating to the hot-products being purchased. Such product information is used to determine the expected weight of such hot-products and the price of such hot-products. The expected weight and pricing information may be contained in the product information retrieved form the electronic tags. Alternatively, the product information may be used to access a remote database to retrieve the necessary weight and pricing information. Next the measured weight of the hot-products being purchased is determined. If the measured weight of the hot-products is within a predefined expected weight for such hot-products, the customer is notified of a valid automatic check-out. Otherwise, a message may be transmitted to a retailer customer care representative requesting assistance with the check-out process.

Also included in such method is automatically adjusting the sales price to allow for qualifying promotional offerings. It should be noted that the step of using said product-information to determine the price of hot-products includes the steps of retrieving information relating to promotional offers associated with the hot-products being purchased and automatically adjusting the purchase price of such hot-products consistent with the terms of the promotional offer(s).

Additionally, the step of determining the weight of the hot-products may be performed by weighing all hot-products at the same time while on a scale associated with said customer-storage-area. Similarly, the smart tags associated with the hot-products may be simultaneously scanned or substantially simultaneously scanned. Methods for receiving multiple smart tag transmissions and avoiding data transfer "collisions" are well known by those skilled in the art.

Alternatively, the weight of said hot-products may be determined singularly and electronic tags scanned singularly at a point-of-sale check-out-station. Such hot-products may also be weighed at the same time and smart tags scanned at the same time while such products are on a scale associated with said check-out-station. As before, the customer is automatically notified when the check-out process has been validated and payment is requested. The customer would ideally tender payment using well known technology such as a credit/debit card reader thereby completing an automatic check-out process.

Additional embodiments of the present subject matter, not necessarily expressed in this summarized section, may include and incorporate various combinations of aspects of features or parts referenced in the summarized objectives above, and/or features or components as otherwise discussed in this application.

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which.

Figure 1:
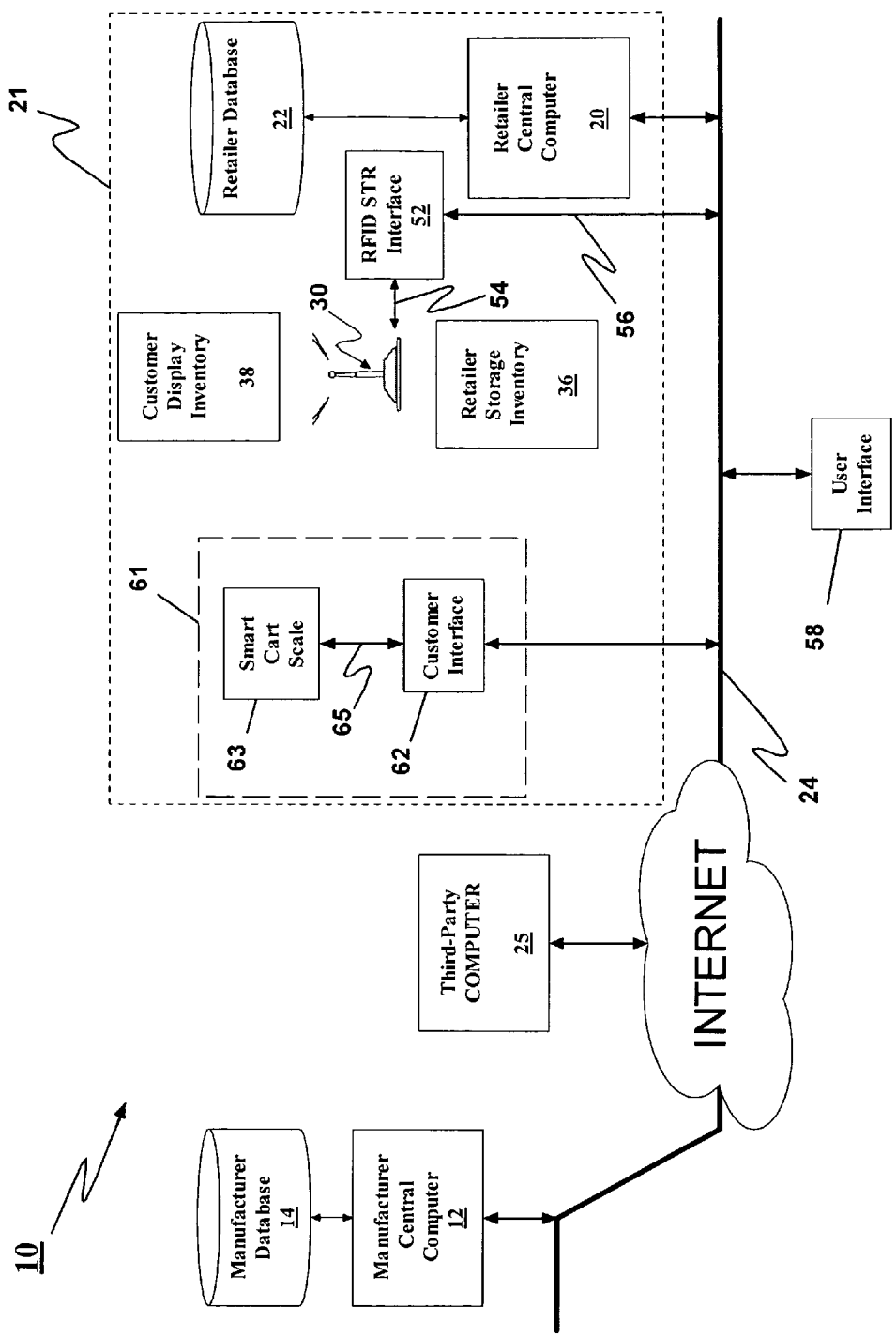
FIG. 1 is a block diagram illustration of an exemplary supply chain incorporating an RFID based system in accordance with one possible embodiment of the invention.

Repeat use of reference characters throughout the present specification and appended drawings is intended to represent same or analogous features or elements of the present technology.

DETAILED DESCRIPTION

Reference will now be made in detail to one or more embodiments of the invention, examples of which are graphically illustrated in the drawings. Each example and embodiment are provided by way of explanation of the invention, and not meant as a limitation of the invention. For example, features illustrated or described as part of one embodiment may be utilized with another embodiment to yield still a further embodiment. It is intended that the present invention include these and other modifications and variations.

FIG. 1 is a block diagram illustration of an exemplary RFID based promotional offering system, or simply system 10, depicting various components of a supply chain in accordance with the present invention. Exemplary system 10 represents a retail supply chain for any type of product and includes a manufacturing central computer 12 associated with a manufacturing database 14 and a retailer central computer 20 associated with a retailer database 22, all interconnected via a standard wired and/or wireless communication link 24. It should be appreciated that manufacturing central computer 12 and retailer central computer 20 may be connected to a common database without departing from the scope of the disclosed technology and methodology. For example, manufacturer database 14 and retailer database 22 may be incorporated into a single database.

RFID STR 30 represents one or more smart tag readers (sometimes referred to as RFID scanners) of conventional design and are used to retrieve the information contained in RFID smart tags. RFID STR 30 is one possible embodiment of an electronic tag reading devices that may, for example, comprise an RF transmitter and receiver and an antenna to communicate with RFID transponders, such as RFID smart tags. Such RFID STR devices may include a microprocessor and software programs for this purpose. Exemplary readers include Matrics® Advanced Readers manufactured by Matrics, Inc. (Columbia, Md.), Alien Technology (Morgan Hill, Calif.), or Philips Semiconductor (Eindhoven, The Netherlands). Another example of an RFID STR device is an RFID reader manufactured by Antenova Ltd. (Cambridge, England) or Bancolini B30 handheld RFID Scanner manufactured by Bancolini (Bologna, Italy).

RFID STR 30 may be accessed through RFID STR interface 52. Such RFID STR interface may be, for example, a standard PC or PDA device incorporating a digital interface designed to facilitate communication between RFID STR devices and a computing device connected to wired or wireless communication link 24. RFID STR interface 52 may comprise a gateway for connecting two otherwise incompatible systems or for simply providing a connection between two compatible systems. RFID STR Interface 52 may also be incorporated into retailer central computer 20. Communication link 56 may provide a wired or wireless connection from RFID STR Interface 52 to communications link 24.

RFID Smart Tag Reader (STR) 30 represents one or more RFID STR devices disposed at various locations within retailer store 21. To facilitate remote access to such RFID STR device(s), a networking system, such as a local area network (LAN), may be utilized. In one embodiment, such RFID STR 30 device incorporates a TCP/IP protocol suite and an HTTP (HyperText Transfer Protocol) server to provide two-way access to the RFID STR 30 data. Such TCP/IP protocols and HTTP server technology are well known in the art. For such an embodiment, the RFID STR 30 device(s) include an HTTP server and a TCP/IP protocol stack. The RFID STR interface 52 may provide a gateway (between computers connected to communications link 24 and RFID STR 30) which ideally enables continuous remote access to the RFID STR 30 devices. A gateway is an electronic device that connects two otherwise incompatible systems or that simply provides a connection between two compatible systems.

Alternatively, the TCP/IP protocol suite may be incorporated into a gateway serving multiple RFID STR devices via a wired or wireless two-way network. The gateway may incorporate an HTTP server for accessing data from multiple RFID STR devices and for transmission of data to individual RFID STR devices.

In the above described system 10 configuration, communications link 24 provides access to a first network (such as the Internet) operating in accordance with a predetermined protocol (TCP/IP is one example). A plurality of RFID STR 30 devices may comprise a second network. A gateway (RFID STR Interface 52) operatively couples the first network to the second network. Finally, an HTTP server is embedded in either the gateway or the plurality of RFID STR devices facilitating the transfer of data between the two networks. With such a configuration, one of ordinary skill in the art will appreciate that individual RFID STR devices or groups of RFID STR devices may be accessed as if the STR devices were a web site and their information could be displayed on a web browser.

Such technology is fully disclosed by Ardalan et al. in U.S. Pat. No. 6,363,057 for use in a system for communicating with electricity meters, which is hereby incorporated by reference for all purposes.

As noted above, RFID STR 30 represents one or more RFID STR devices located at a retailer storage inventory 36 and customer display inventory 38. STR 30 is connected to RFID STR interface 52 via a wired or wireless communications link 54. With such a configuration, manufacturing central computer 12, retailer central computer 20, user interface 58, third-party computer 25 and any properly configured computing device connected to communications link 24 and may transmit and receive data to and from RFID STR 30 as well as customer-interface 62.

User interface 58 represents one or more devices designed for providing access to electronic data systems. Such devices include a computer, a terminal, PDA or any digital device configured for accessing data systems. One or more user interface 58 devices may be located wherever access is required to system 10.

Internet link 24 is a standard Internet link that typically provides a two way communication link between system 10 and networks external to system 10, although Intranet computers can also be accessed through such a link. For example, potential customers of retailer store 21 may use Internet link 24 to shop for products sold by a retailer store 21, perhaps by accessing product descriptions stored on database 22. Customers may also obtain real-time product inventory data as well as other information related to the retailer's products.

Still referring to FIG. 1, a block diagram representation of an exemplary smart cart 61 is depicted. Smart cart 61 may comprise a customer-interface 62 and a smart-cart-scale 63. Smart cart 61 is a device a customer would use while shopping to store and transport the products the customer anticipates purchasing. Exemplary smart cart 61 provides a customer-storage-area 67 (FIG. 2) where the bottom of such customer-storage-area 67 comprises an item evaluator, such as smart-cart-scale 63. Smart-cart-scale 63 is in communication with customer-interface 62 via wired or wireless communication link 65.

Smart-cart-scale 63 is one possible embodiment of an item-evaluator. An item-evaluator is an electronic device associated with customer-storage area 67 and designed to measure a physical parameter, such as weight, of hot-products in customer-storage area 67. The general purpose of such an item-evaluator is to provide a means for cross referencing the electronic tag data retrieved from hot products. Such cross referencing provides added confidence that all items are associated with proper electronic tag, that such electronic tags are working properly and that such electronic tags have been programmed properly and/or that the supplemental-product-information associated with hot-products is accurate.

Customer-interface 62 (shown FIG. 1, FIG. 2 and FIG. 4) is an electronic device preferably supplied by the retailer and used by a customer while shopping for products in customer display inventory 38. Customer interface 62 may have a conventional hardware and software architectural design suitably adapted for sending messages to and receiving messages from a central computer (such as retailer central computer 20) and/or RFID STR devices (such as RFID STR 30). While customer interface 62 is portrayed as having a built-in visual display screen 64, it should be recognized that customer display 62 may comprise a plurality of physically separated but cooperatively associated electronic devices that are not shown independently such as a radiofrequency transmitter and receiver, a processor, one or more display means such as a visual display screen 64, a magnetic card reader, an audio speaker, and the like, each communicating with or under control of a central computer, ideally central computer 20. Customer interface 62 may incorporate an alarm or alert feature wherein the customer is notified of special product offerings. Customer interface 62 may also comprise an RFID STR device.

Figure 2:
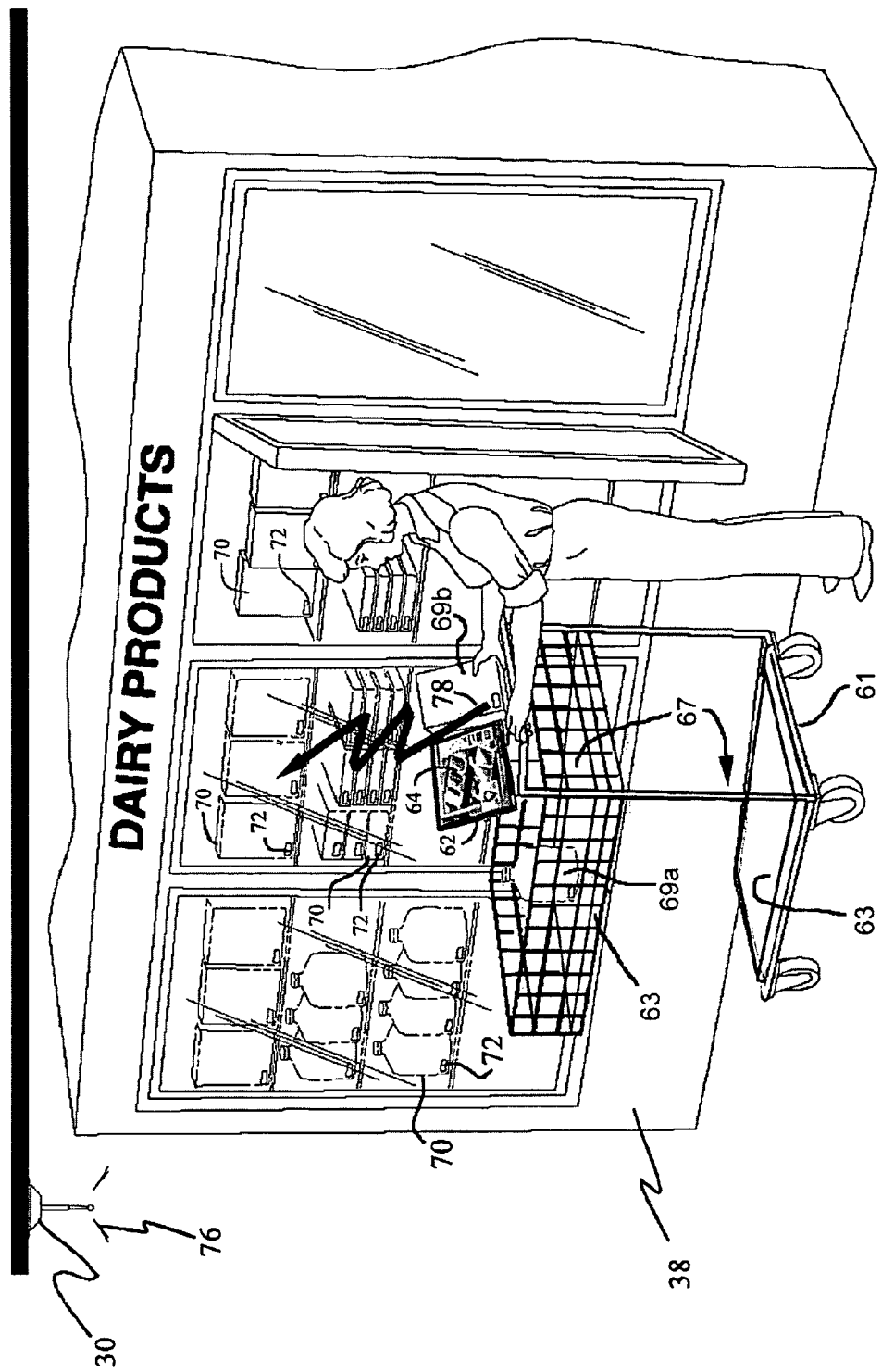
FIG. 2 is a graphic illustration of products and associated RFID smart tags in a customer inventory location, an exemplary smart-cart and hot-products in a customer-storage-area and hot-products being view by a customer in accordance with one possible embodiment of the invention.

As noted above, smart cart 61 comprises a customer-storage-area 67 for storing products a customer anticipates purchasing, referred to herein as "hot-products." Restated, a "hot-product" is a product that a customer is presently examining or a product that a customer has placed in customer-storage-area 67. FIG. 2 depicts two hot-products, 69a and 69b.

Customer-interface 62 may be in communication with a remote computer, such as retailer central computer 20, manufacturer central computer 12, user interface 58, third-party computer 25 or any properly configured computing device connected to communication link 24. With this configuration, customer-interface 62 may be used to retrieve, from a remote computer, supplemental-product-information associated with hot-products. For example, customer-interface 62 may use an associated RFID STR device to retrieve product information from electronic tags associates with exemplary hot-products 69a and 69b. For this example, such product information comprises a Universal Product Code (UPC). Customer-interface 62 would transmit such product information to a remote computer, such as retailer central computer 20, and request supplemental-product-information. Retailer central computer 20 may respond by transmitting selective supplemental-product-information back to customer-interface 62 to be displayed for customer viewing on LCD display 64.

Generally speaking, supplemental-product-information is any information associated with a product that is not part of the product information retrieved from an electronic tag or stored in an electronic tag. Such supplemental-product-information may comprise, for example, cross-marketing promotional offers, expected product weight values, product descriptions, product location within the retailer store and other such information. Exemplary promotional information includes information relating to cross-marketing promotional offers wherein such offers may be real-time promotional offers or near real-time promotional offers. The smart cart computer is further configured to present product information and supplemental-product-information to the customer.

Ideally, the smart cart computer associated with customer-interface 62 is in wired or wireless communication with smart-cart-scale 63. Suitable wireless communications technologies are well known in the art, examples of which include Wi-Fi (wireless fidelity) and Bluetooth. With such a configuration, the smart cart computer can obtain a total-measured-weight of the product or products on the smart-cart-scale and compare such total-measured-weight to the expected-total-weight. The smart cart computer would determine the expected-total-weight using product information or supplemental-product-information retrieved from smart tags 72 or a remote computer respectively. If the total-measured-weight is within a predefined weight-tolerance of the expected-total-weight, there is an increased confidence that all products on the smart-cart scale are associated with operable electronic tags. Conversely, when a product added to the customer-storage-area results in a total-measured-weight that is not within such predefined weight-tolerance of the expected-total-weight, customer-interface 62 may issue an alert to the customer.

For example, assume an exemplary predefined weight-tolerance of 98% of the expected-total-weight. If the expected total weight for 10 products is 100 pounds and the total-measured-weight is only 95 pounds, the smart cart would issue an alert. Such alert may be transmitted to the shopper or to a customer service representative. Such an alert would put the shopper on notice that something associated with the last added product (inoperable smart tag, missing smart tag, incorrect product information, etc.) placed in customer-storage-area 67 is faulty and that such product will likely result in a longer check-out time (due to a customer service person having to troubleshoot the problem and/or manually check-out the item). Thus, such an alert gives a customer the opportunity to switch the product with another product (same product type, just in a different package) before proceeding to a point of sale. Anyone who has experienced check-out delays due to bad product labeling associated with prior art check-out systems (i.e. optical bar code systems) will appreciated the value of this feature.

The above example used a "total expected weight" value and measured the total expected for all the products in customer-storage-area 67. It should be appreciated that the smart cart computer could just as easily determine the added additional weight of the last item placed on smart-cart-scale 63 and issue an alert when the added weight is not correct. For example, assume for a moment that nine items weighing 90 lbs. are on smart-cart-scale 63. A tenth item is placed on smart-cart-scale 63 and the total weight goes up to 100 lbs. The smart cart computer may detect that 10 lbs. has been added on top of smart-cart-scale 63 and scan the smart tags associated with the items on smart-cart-scale 63. The smart cart computer may then receive information for the newly added item including expected weight information for item ten. If the measured weight for item ten is not within a predefined weight tolerance of the expected weight, then the smart cart computer issues an alert. It should be appreciated that both methods use (directly or indirectly) the expected total weight of hot-products.

Smart cart 61 also allows for remote updating of a shopping list. Customer-interface 62 ideally allows a customer to establish a communication connection with third-party-computer 25 via communications link 24. Such a remote communication connection could be established, for example, using an IP address associated with third-party-computer 25 and software for facilitating remote communication connections. Examples of such software include Virtual Network Computing (VNC) and Windows Remote Desktop. Alternatively, an instant messaging type connection could be established between customer-interface 62 and third-party computer 25 allowing a customer to send and receive instant text message, VoIP (Voice Over IP) messages and/or video enabled messages to a person associated with third-party-computer 25.

For example, suppose person A sends person B to a grocery store to purchase products W, X and Y. Person B travels to retailer store 21 and acquires smart cart 61. Person B uses customer-interface 62 to establish a communication connection with third-party-computer 25 which may be monitored by person A. Alternatively, person B could simply log into an instant messaging system. While person B is at the grocery store purchasing products W, X and Y, person A discovers that person A also needs product Z. Using third-party-computer 25, person A accesses person B's shopping list and automatically updates the list. Alternatively, person A simply sends person B an instant message informing person B to also purchase product Z. Ideally, such a communication connection would be established automatically when person B enters a customer ID (or scans an ID card, smart card, etc.) into customer-interface 62. Additionally, for a video/camera enabled customer-interface 62, person B could send a snapshot or video image of a product to person A so that person A can verify that person B has the correct product.

Again referring to FIG. 2, exemplary retailer products 70 stored in customer display inventory 38 are shown. In the FIG. 2 illustrated embodiment, the products 70 are food products. It should be appreciated that this is for purposes of illustration only. The products may just as well be clothing items, hardware items, and other staple items of commerce. Such exemplary retailer products 70 are provided or associated with respective RFID smart tags 72. As discussed in greater detail below, the smart tags 72 transmit a coded pulsed signal 78 containing product information in response to an electronic "trigger" 76 from a STR 30.

The smart tags 72 may be attached directly to the products 70, as illustrated in FIG. 2. In this embodiment, the smart tags 72 may be, for example, adhesive backed labels or tags that are attached directly to the packaging of the products 70. Alternatively, such smart tags 72 maybe attached to containers that are specially designed to hold such products. For example, a toothbrush and its associated factory packaging could be placed in a tubular container where a smart tag 72 is attached to said tubular container. Such container may be reusable.

Similarly, system 10 according to this embodiment of the invention includes a combination of smart tags 72 attached directly to the products as well as the location where such products are to be placed on display for customers to view while shopping. For example, a smart tag 72 may be attached to both the products 70 and the shelves containing the products 70 along with or incorporated with the store's own identification labels.

In general, as shown in FIG. 2, a different smart tag 72 is associated with each distinct product. For example, if the retailer carries three different brands of milk, then a different smart tag may be associated with each brand. Similarly, if three different size containers of the same brand of milk are carried by the store, then a different smart tag 72 may be associated with each different sized container.

The product identification information stored in the smart tags 72 is not limited in scope, and may include, for example, information identifying the type of product, brand name of product, manufacturer of the product, etc. The type of product information stored in smart tags 72 is preferably adequate to correlate with various manners of listing desired products. For example, certain customers may only list "milk" and "butter" in a generic sense in their respective lists of desired products. Different customers may identify the milk and butter by a particular brand name. The stored product identification information should be adequate to assimilate all reasonably conceivable methods of listing desired products.

With conventional RFID "smart" systems, the smart tags 72 are passive devices. As shown in FIG. 2, RFID STR 30 emits a trigger excitation signal 76 received by an internal antenna in the smart tag 72. This signal 76 causes the smart tag 72 to generate and transmit signal 78, an electromagnetic pulse of coded digital data containing the product identification information. The coded signal 78 is received by the RFID STR 30 (or customer-interface 62), decoded, and the product identification information is presented to retailer central computer 20, in any number of ways. Retailer central computer 20 may then transfer any relevant product information to customer-interface 62.

RFID smart tag technology is known and understood by those skilled in the art, and a detailed explanation thereof is not necessary for purposes of describing the method and system according to the present invention. Generally, conductive or passive smart tags 72 consist of silicon or other semiconductors, a coiled, etched, or stamped antenna, a capacitor, and a substrate on which the components are mounted or embedded. A protective covering is typically used to encapsulate and seal the substrate. Inductive or passive smart tags have been introduced by Motorola under the name "BiStatix." A detailed description of the BiStatix device may be found in U.S. Pat. No. 6,259,367 B1, incorporated herein by reference in its entirety for all purposes. Another commercial source of suitable smart tags is Alien Technology Corporation of Morgan Hill, Calif., under the technology name FSA (Fluidic Self-Assembly). With the FSA process, tiny semiconductor devices are assembled into rolls of flexible plastic. The resulting "smart" substrate can be attached or embedded in a variety of surfaces. The smart tag technology under development at the Auto-ID Center at Massachusetts Institute of Technology (Cambridge, Mass.) can also be used within the scope of the present invention. Further information on smart tags and related technology is disclosed in U.S. Pat. No. 6,451,154, "RFID Manufacturing Concepts," issued Sep. 17, 2002 to Grabau et al.; U.S. Pat. No. 6,354,493, "System and Method for Finding a Specific RFID Tagged Article Located in a Plurality of RFID Tagged Articles," issued Mar. 12, 2002 to Mon; PCT publication WO 02/48955, published Jun. 20, 2002; U.S. Pat. No. 6,362,738, "Reader for Use in a Radio Frequency Identification System and Method," issued Mar. 26, 2002 to Vega; D. McFarlane, "Auto-ID Based Control," White Paper for the Auto-ID Centre Institute for Manufacturing, University of Cambridge, Cambridge, United Kingdom, Feb. 1, 2002, available at www.autoidcenter.org/research/CAM-AUTOID-WH-004.pdf; and Chien Yaw Wong, "Integration of Auto-ID Tagging System with Holonic Manufacturing Systems," White Paper for the Auto-ID Centre Institute for Manufacturing, University of Cambridge, Cambridge, United Kingdom, September 2001, available at www.autoidcenter.org/research/CAM-WH-001.pdf. Such references are hereby incorporated herein by reference in their entirety for all allowed purposes.

Other RFID technologies believed to be of value for the present invention include those produced by Microchip Technologies (Chandler, Ariz.), which provides remote read-write chips at several frequencies. Also of potential value are the I*CODE chips and readers of Philips Semiconductor (Eindhoven, The Netherlands), which, in one embodiment, are said to include 384 bit configurable read/write memory with 64 bits for a unique serial number (e.g., an electronic product code). Sokymat (Lausanne, Switzerland) markets the PICCOLO read-only RFID disc tag which transmits data to a reader station by an AM radio signal. The tag is said to have 64 bits of data that can be programmed during manufacture by laser fusing of polysilicon links in order to store a unique code on each tag.

Texas Instruments (Dallas, Tex.) offers RFID technology as part of Texas Instruments RFID (TI*RFID™) Systems, formerly known as the TIRIS™ system (Texas Instruments Registration and Identification System), which is used to track and identify various assets using devices such as the TI Tag It™ chip.

Gemplus (Gemenos, France) provides smart tags (sometimes called "smart labels") and smart cards employing RFID technology, which may be used as smart tags. They also market interfaces, antennas, scanners and software that can be adapted for use with smart tags.

Nedap (Groenlo, The Netherlands) provides smart cards and a 13.56 MHz smart tag using RFID technology with 512 bits of read-write memory with a range of about 120 cm. It is claimed that about 20 such tags per second can be read successfully by a scanner.

Checkpoint Systems Inc. (Miami, Fla.) offers a smart tag with WORM technology (write once, read many). One example is the MCRF355 chip, described more fully at www.idsystems.com/reader/1999_05/join0599.htm.

PDA-like reader systems and other portable readers for RFID technology are marketed by Omron Company (Tokyo, Japan), such as the Model V700 or V720 series.

High frequency bands can be used in RFID technology, such as bands between 300 MHz and 10 GHz. SCS Corporation (Rancho Bernardo, Calif.), for example, markets smart tag technology at 2.45 GHz. Ultra-wide band technology can also be adapted for RFID systems.

A related technology within the scope of the present invention is Surface Acoustic Wave (SAW) technology. For example, InfoRay (Cambridge, Mass.) markets a passive smart tag that is said to achieve long ranges (up to 30 meters) using a Surface Acoustic Wave (SAW) device on a chip coupled with an antenna. The SAW device converts a radio signal to an acoustic wave, modulates it with an ID code, then transforms it to another radio signal that is emitted by the smart tag and read by a scanner. The ID code of the smart tag is extracted from the radio signal. The scanner is said to compare the spectral content of the signal with a database of signatures to derive the ID code. This method enables a read range of up to 30 m (typical 10-20 m). The system can operate in the 915 MHz band and 2.45 GHz band. RFSAW, Inc. (Dallas, Tex.) also provides minute Surface Acoustic Wave (SAW) RFID devices that can be used within the scope of the present invention.

The antenna embedded within the smart tags 72 is generally one component of the device, though it is recognized that alternatives to antennas may exist in some applications. For example, for some metallic objects, the smart tag need not comprise an antenna but the metallic object itself can serve as the antenna. The excitation signal 76 from the RFID STR 30 can be received by the antenna to "activate" the smart tag. The received excitation signal 76 is the power source for the smart tag 72 and results in the generation of the electromagnetic pulse containing the coded product identification information signal 78. A detailed description of RFID smart tag antennas may be found in U.S. Pat. No. 6,320,556 B1, incorporated herein by reference for all purposes.

In an alternate embodiment, the smart tags 72 may be active devices. In this configuration, the smart tag 72 includes active transceiving circuitry that has the capability to selectively respond to coded request signals transmitted by an RFID STR 30. The active smart tag 72 may include the capability to delete its fixed code and receive new or additional information beyond the information contained in its fixed code. An active smart tag 72 requires an internal power supply, such as a micro-battery, thin film battery, or the like. Active tags 72 may be desired in the scenarios wherein the tags 72 are mounted at storage locations of particular products. In this way, as different products are stored at the respective locations, the smart tags 72 can be programmed accordingly.

Figure 3:
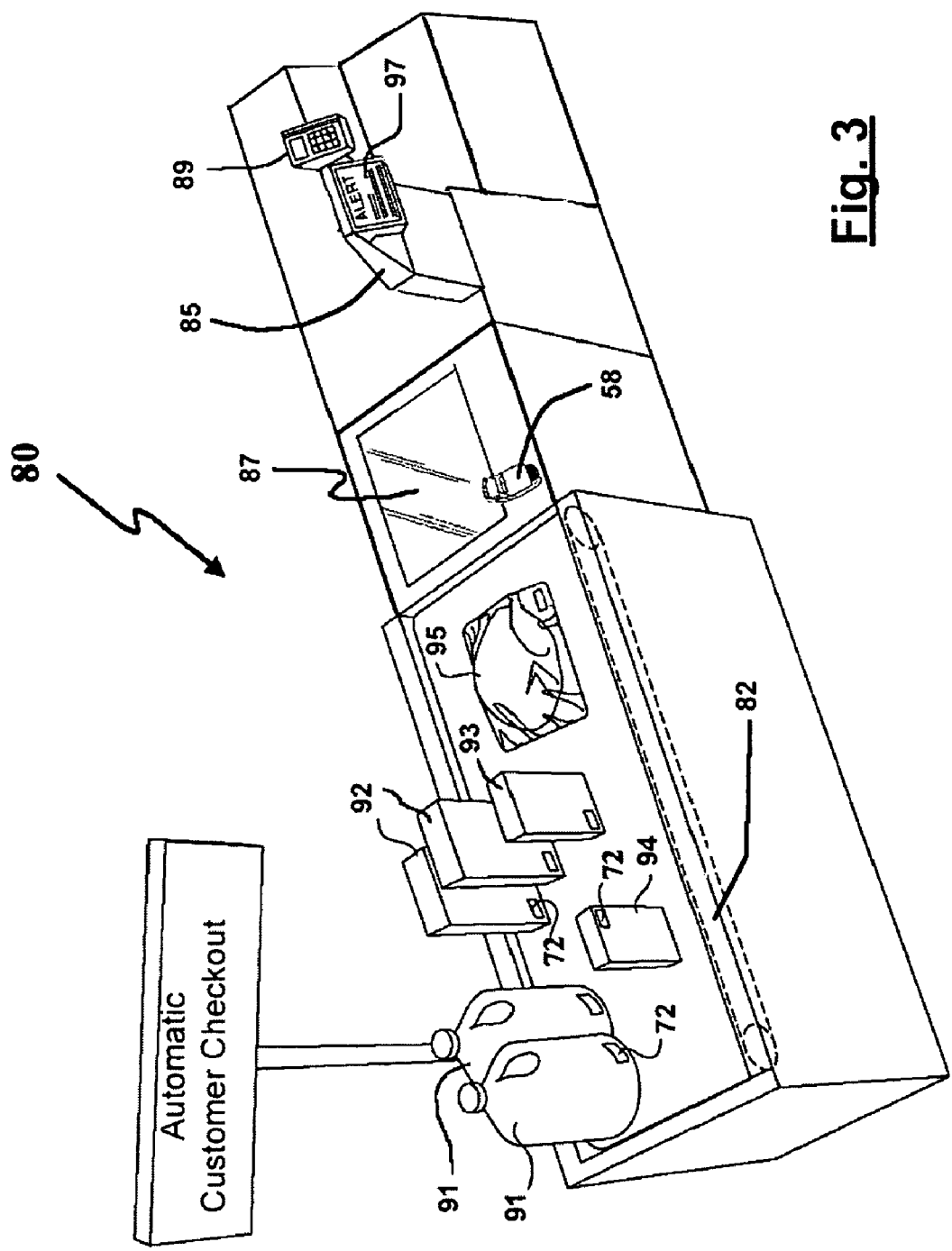
FIG. 3 is a graphical illustration of an exemplary point of sale location comprising an automatic check-out-station in accordance with one possible embodiment of the invention.

Referring now to FIG. 3, a point of sale comprising an automatic check-out-station 80 is presented. Check-out-station 80 comprises check-out computer 85, card reader 89, scale 82, an electronic tag reader (not shown) incorporated in check-out computer 85 and a legacy optical bar code scanner 87. Check-out computer 85 is in communication with card reader 89, scale 82 and optical bar code scanner 87. Check-out computer 85 may also be in communication with retailer central computer 20 and/or manufacturer central computer 12 via communication link 24 or any other suitable communication link. Hot-products 91-95 are placed on scale 82 allowing check-out computer 85 to determine a total-measured-weight for such hot-products. Check-out computer 85 uses an electronic tag scanner to retrieve product information stored in electronic tags 72 associated with hot-products 91-95. Check-out computer 85 may also obtain supplemental-product-information for hot-products 91-95 from a remote computer, such as retailer central computer 20 and/or manufacturer central computer 12. Using at least part of the retrieved product information and/or supplemental-product-information, check-out computer 85 determines the total sales price for hot-products 91-95 automatically adjusting the total sales price to compensate for qualifying promotional offers, such as cross-marketing offers.

For example, suppose manufacturer X offers a cross-marketing promotional offer that reduces the price of hot-product 93 by 10% when a customer purchases hot-product 92. When a customer places hot-product 92 and hot-product 93 on scale 82, check-out computer 85 scans the electronic tags 72 associated with hot-products 92 and 93, retrieves product information and/or supplemental-product-information for hot-products 92 and 93, determines that a qualifying cross-marketing promotional offer has been accepted and automatically reduces the sales price for hot-product 93 by 10%.

Figure 4:
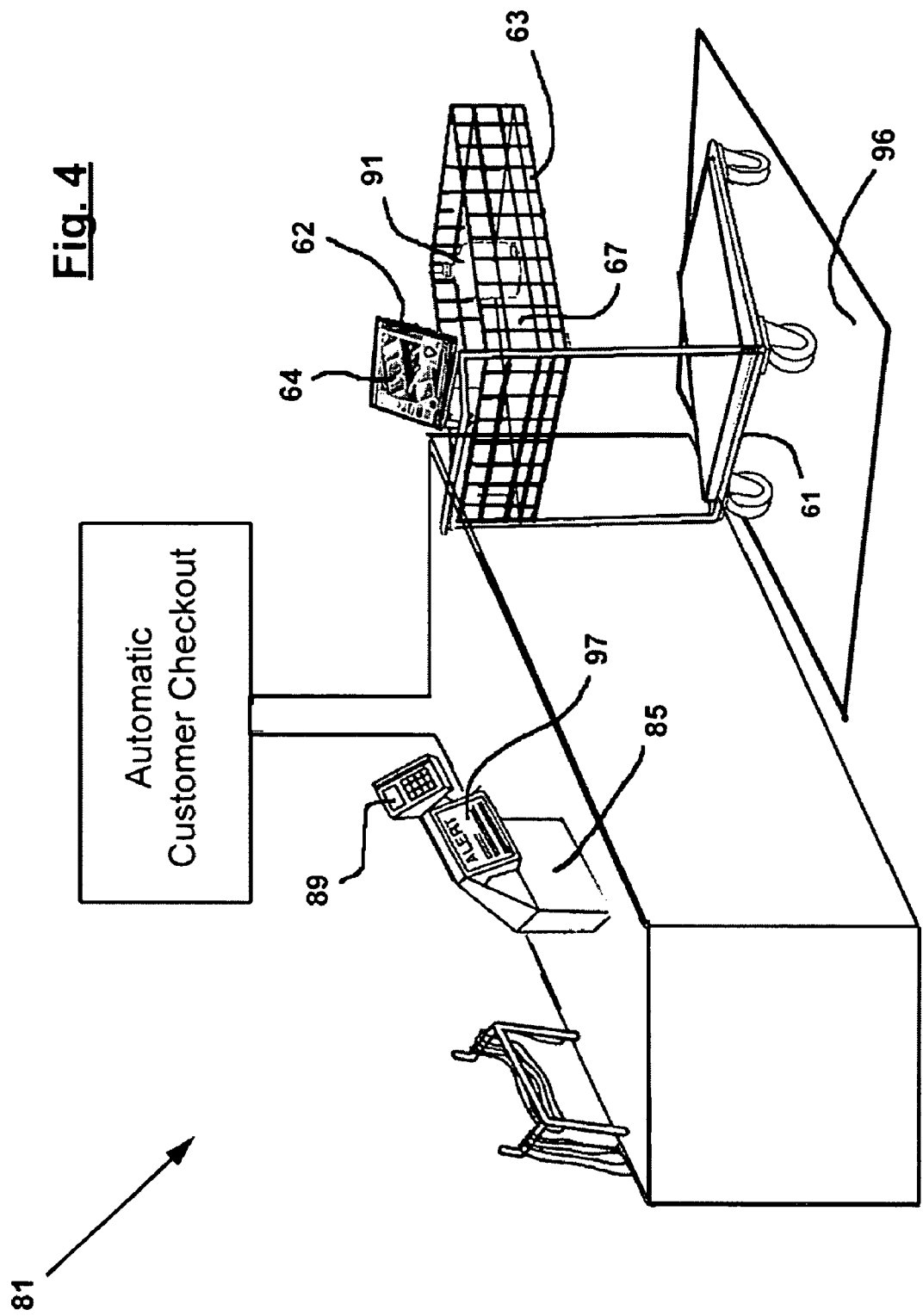
FIG. 4 is a graphical illustration of an exemplary point of sale location comprising an automatic check-out-station used in conjunction with a smart-cart in accordance with one possible embodiment of the invention.

FIG. 4 presents one exemplary embodiment of an automatic check-out station used in conjunction with smart cart 61. To initiate the automatic check-out process, a customer places smart cart 61 within area 96. Automatic check-out-station 81 may automatically detect the presence of smart cart 61 in area 96 or a customer may initiate the automatic check-out process using check-out computer 85 and performing the appropriate function (such as pushing a "start automatic check-out button"). Check-out computer 85 may then access customer-interface 62 and validate the product information associated with hot-product 91 as well as the measured hot-product 91 weight information. If such information is deemed acceptable, check-out computer 85 validates the automatic check-out and the customer is presented with a total purchase price and payment is requested. Such customer may then "swipe" a credit card, debit card or other suitable card through card reader 89 to pay the total purchase price. As before, the total purchase price has been automatically adjusted to account for any qualifying promotional offers, such as cross-marketing promotional-offers.

Figure 5:
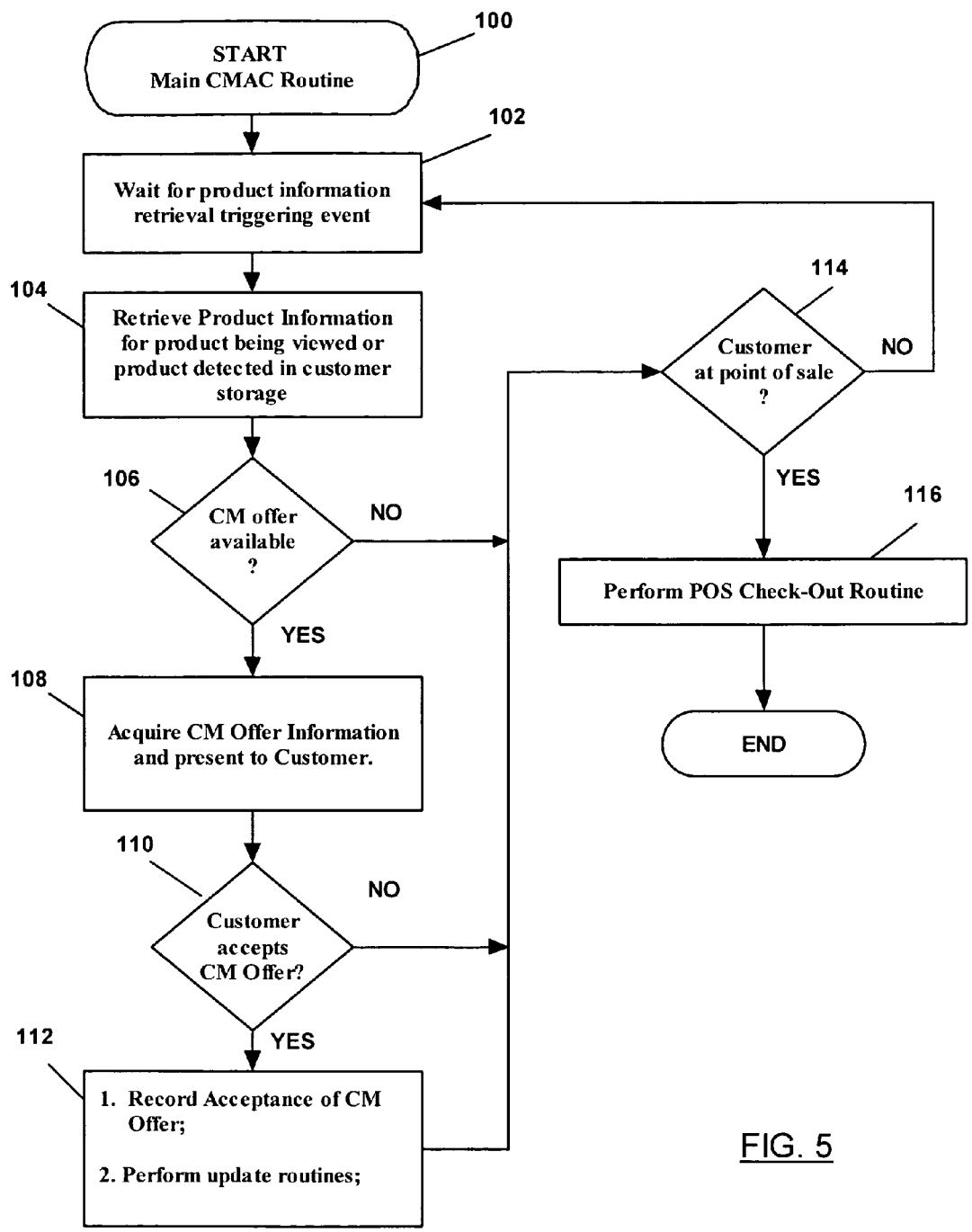
FIG. 5 is a logical flow chart of an exemplary Main CMAC routine according to the invention.
Figure 6:
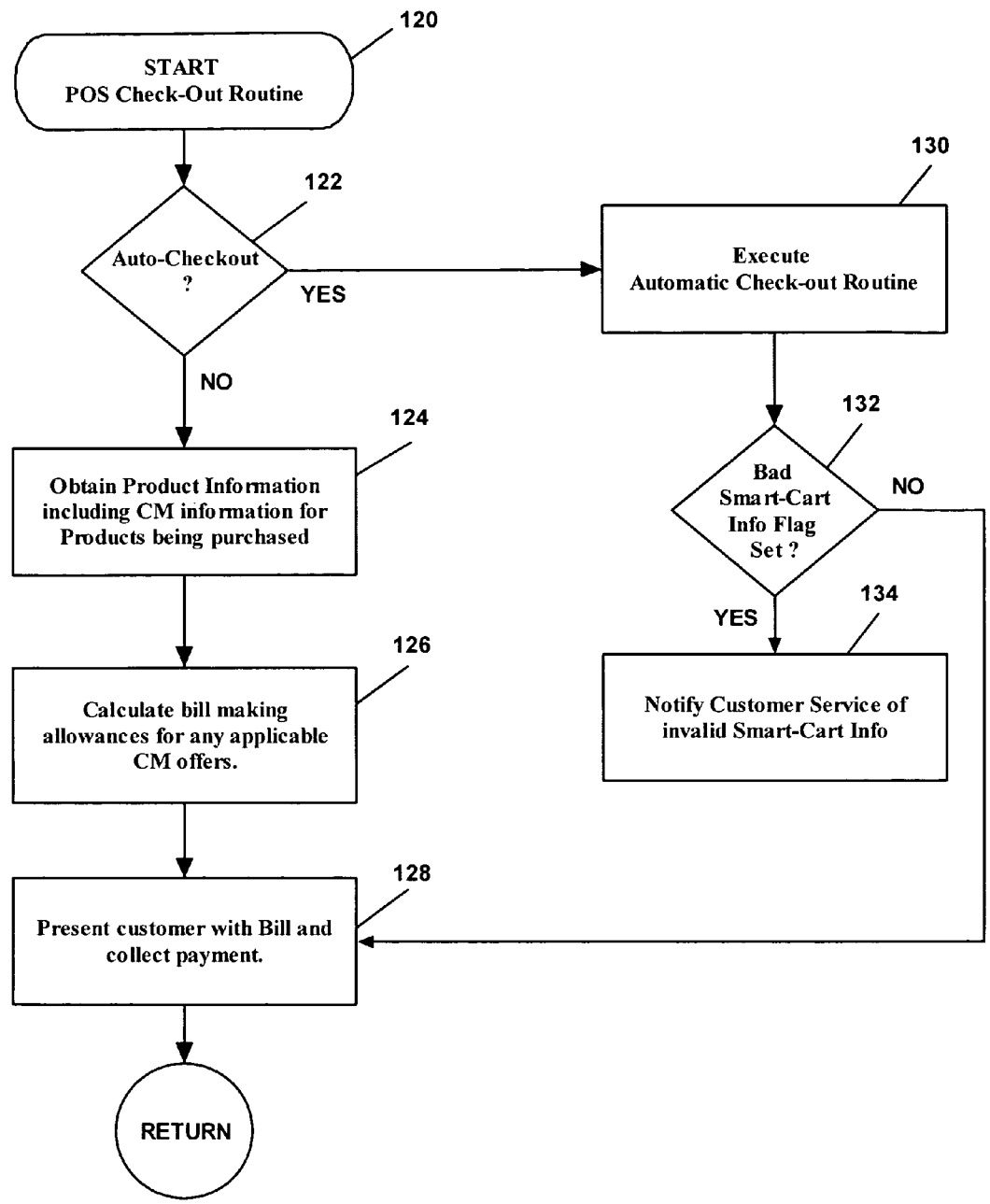
FIG. 6 is a logical flow chart of an exemplary POS Check-Out routine according to the invention.
Figure 7:
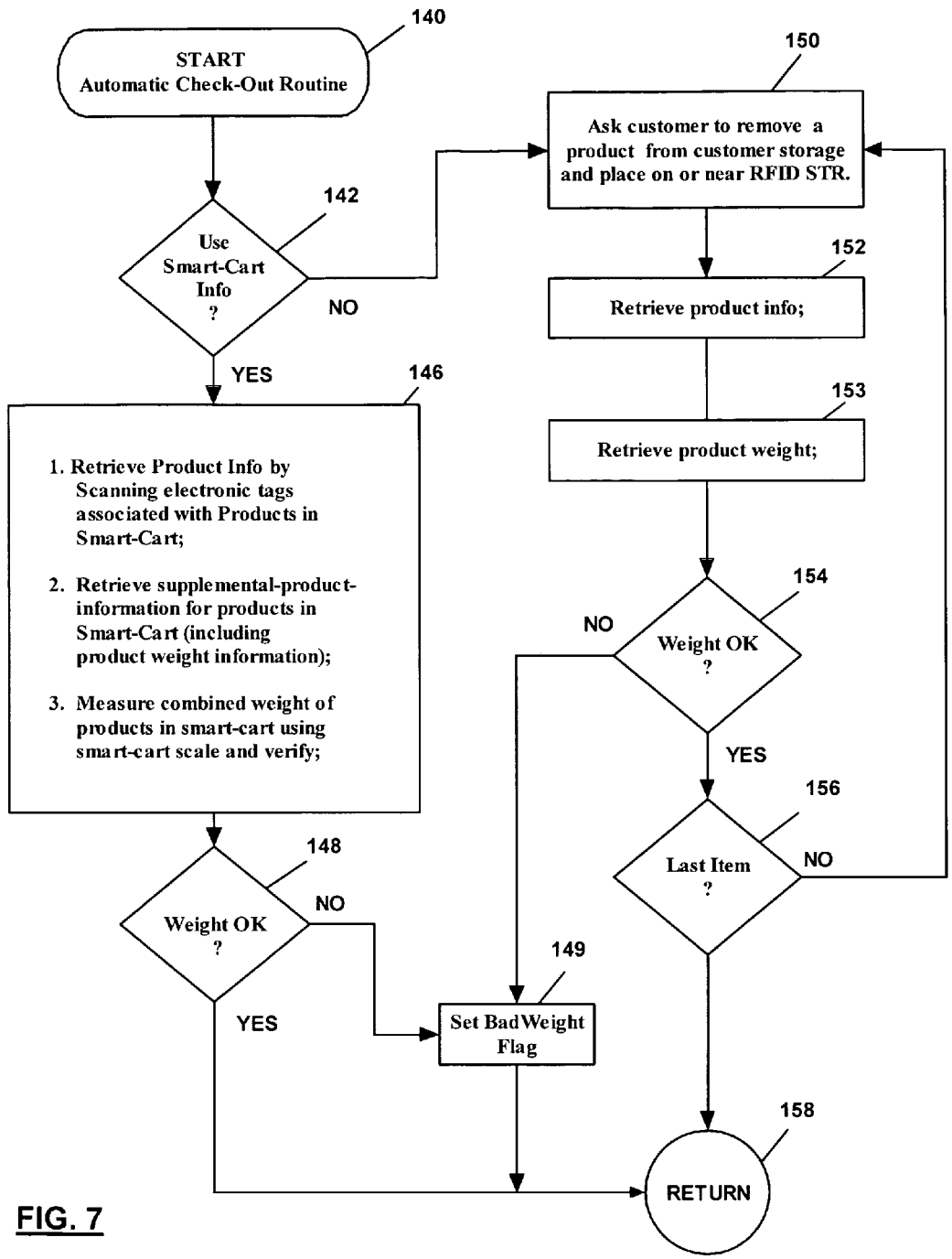
FIG. 7 is a logical flow chart of an exemplary Automatic Check-Out routine according to the invention.

Examples of methodologies for using system 10 are now discussed. FIG. 5 is a high level block diagram depicting exemplary logic for a Main Cross-Marketing & Automatic Check-out (CMAC) routine. Main CMAC routine is preferably implemented in software executed by a computer associated retailer central computer 20 or customer-interface 62. It should be appreciated, however, that any computer with access to communications link 24 may be the computer executing the CMAC routine and hereafter such computer will simply be referred to as the "computer." Step 100 marks the entry point into the exemplary CMAC routine shown in FIG. 5. At step 102, the computer waits for a product-information retrieval triggering event. Exemplary product-information triggering events ideally coincide with "points of purchasing decision." Examples of "points of purchasing decisions" include: (1) the moments when a customer is viewing a product while shopping, (2) the entire time while shopping for products that have been placed in a customer storage area, (3) the moments at a point of sale (the check-out station) and (4) the moments while responding to a customer request for data about a product. Thus, exemplary product-information retrieval triggering events include: (1) a customer picking up a product, (2) a customer placing a product in a customer storage area, (3) a customer presenting at product at a point of sale for purchase, (4) a customer request for product information. The products that trigger the above-described product-information retrieval process are hereafter referred to as "hot-products." Upon detecting a triggering event, the computer retrieves product information stored in electronic tags associated with such hot-products (step 104). Additionally, the computer may access supplemental-product-information using such retrieved product information. With such information, at step 106, the computer determines if a cross-marketing (CM) promotional offer is associated with the hot-product(s). If no cross-marketing promotional offer is associated with the hot-product(s), program control passes to step 114. If, however, a cross-marketing promotional offer is associated with the hot-product(s), the computer presents the cross-marking promotional offer to the customer (step 108). Such information may be presented, for example, using an LCD and/or speaker associated with a customer interface, such as customer interface 62. Such information would typically include a description of the second item for which the customer will receive a reduced price if such customer purchases the hot-product. Such information may also include in-store location information to assist the customer in locating the second item.

At step 110, the computer determines if the customer accepts the cross-marketing promotional offer. Step 110 may be accomplished by requesting the customer to respond to a computer generated question and detecting/recording the customer response. For example, the computer may transmit cross-marketing promotional offer information and then present the following: "If you accept this offer, please press 1."

Alternatively, detecting acceptance of the cross-marketing offer may simply comprise determining if the second item is added to a customer display inventory location. Using this method, step 110 and 112 may be skipped (i.e. program control passes directly from step 108 to step 114) and/or performed later. At step 114, the computer detects when a customer has arrived at a point-of-sale and executes the exemplary "POS Check-out" routine.

Point 120 marks the entry into an exemplary point of sale (POS) check-out routine. At steps 122, the computer determines if an automatic check-out is desired. If an automatic check-out is not desired, program control passes to step 124 and the typical, well known manual check-out process is begun where a retailer employee scans the hot-products. However, even with such manual check-outs, benefits of the disclosed invention can still be leveraged. At step 124, electronic tags associated with hot-products are scanned and at least part of the product information stored in such tags is retrieved. With this information, the computer may acquire supplemental-product-information. The computer then automatically determines if there are any qualifying promotional offers associated with the hot-products and the sales price is automatically adjusted as required. At step 128 the shopper is presented with the bill and payment is requested.

If at step 122 an automatic check-out is desired, program controls passes to step 130 and an exemplary Automatic Check-out routine is executed. Step 140 marks entry into an Automatic Check-Out routine. At step 142, the computer determines if the smart-cart information is to be used. The results of step 142 may be determined by the smart-cart configuration, the status of the smart-cart or other considerations. For example, if the smart-cart does not have an operable scale, then the smart-cart weight info cannot be used. Although it should be appreciated that the smart-cart pricing information could still be used.

If at step 142 the computer determines that the smart-cart info is to be used, at step 146 the hot-product's weight information and smart tag information is verified by rescanning the electronic tags associated with the hot-product(s) and reacquiring the weight of the hot-product(s). Alternatively, previously acquired electronic tag and weight data may be used (no rescanning or reweighing).

If the hot-product's weight and electronic tag information are acceptable, a valid automatic check-out has been deemed achieved (i.e. "BAD Smart-Cart Info" flag will not be set) and program control passes back to the calling routine. If, however, at step 148 the smart-cart weight and/or electronic tag information for the hot-product(s) are not acceptable, then a "Bad Smart-Cart Info" flag is set and program control jumps back to the calling routine (i.e. the POS Check-out routine).

Returning to step 142, if for some reason the smart-cart check-out information can not be entirely used (for example, no scale or bad scale), a different semi-automatic self check-out process can be utilized. At step 150, the computer asks the customer to remove a hot-product from a customer storage area and place such hot-product on, or move such hot-product close to, a check-out station scanner. At step 152, the electronic tags associated with such hot-product are scanned and relevant hot-product information is retrieved as before. Next, at step 153, the weight of the product is acquired. The measured weight and the expected weight is compared and, at step 154, if the weight is OK, program control passes to step 156 to determine if the last item has been scanned. If the last item has been scanned program control simply passes back to the calling program (i.e. the POS Check-out routine). If at step 156 the computer determines that the last item has not been scanned, program control jumps back to step 150.

If at step 154 the hot-product weight is not acceptable, then a "Bad Smart-Cart Info" flag is set and program controls returns to the calling program.

Upon returning to the POS Check-out routine from the Automatic Check-out routine, program control passes to step 132. If the "Bad Smart-Cart Info" flag is set, a customer service person is notified of an invalid smart-cart information condition (step 134). Otherwise, program control passes to step 128 where the customer is presented with the bill and payment is collected.

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

It should also be appreciated that the system and method according to the invention are not limited to any particular type of commercial or market scenario, but have application wherever customer goods or products are typically purchased.

What is claimed is:

1. A system for providing cross-marketing promotional offers to a customer, said system comprising:
   at least one product inventory location for holding distinct products and displaying said distinct products to customers wherein at least one said distinct product is associated with at least one electronic tag, and wherein said at least one electronic tag is configured to convey product information;
   a smart cart defining a customer-storage area used by a customer to store products while shopping;
   at least one electronic tag reading device configured to retrieve information from the at least one electronic tag;
   an electronic computing device in communication with said at least one electronic tag reading device and configured to accept, process, store and output said product information;

said electronic computing device further configured to:
 (a) use said at least one electronic tag reading device to retrieve product information from an electronic tag associated with a hot-product wherein said hot-product is at least one of (i) a product being examined by a customer; or (ii) a product in a customer-storage-area;
 (b) use said product information to determine if a cross-marketing promotional offer is associated with said hot-product;
 (c) notify said customer of a cross-marketing promotional offer determined to be associated with said hot-product; and wherein said promotional offer is one of a real time promotional offer and a near real time promotional offer; and
wherein said smart cart further comprises an item evaluator configured to measure a physical parameter of said hot-product placed in said customer-storage area and to cross reference the measured physical parameter with said product information to verify that the actual hot-product corresponds to the product referenced in said product information.

2. A system for providing cross-marketing promotional offers to a customer as in claim 1, wherein said cross-marketing promotional offer is triggered by at least two items in said customer-storage-area.

3. A system for providing cross-marketing promotional offers to a customer as in claim 1, wherein said electronic tag is an RFID (radio frequency identification device) smart tag and said electronic tag reading device is an RFID STR (smart tag reader) device.

4. A system for providing cross-marketing promotional offers to a customer as in claim 1, wherein said electronic tag reading device is further configured to transmit an electronic tag trigger signal.

5. A system for providing cross-marketing promotional offers to a customer as in claim 1, wherein said electronic computing device is a central computer.

6. A system for providing cross-marketing promotional offers to a customer as in claim 5, wherein said central computer is in communication with a customer-interface associated with said customer-storage-area and wherein said customer-interface is configured to display at least part of said product information received from at least one of said central computer and said electronic tag reading device.

7. A system for providing cross-marketing promotional offers to a customer as in claim 1, wherein said electronic computing device is a computer comprising a customer-interface associated with said customer-storage-area.

8. A system for providing cross-marketing promotional offers to a customer as in claim 7, wherein said customer-interface is in communication with a central computer and wherein said customer-interface is further configured to receive a customer request for a desired product and to transfer said customer request to said central computer.

9. A system for providing cross-marketing promotional offers to a customer as in claim 8, wherein said customer-interface is further configured to receive and display product information from at least one of said electronic tag reading device and said central computer.

10. A system for providing cross-marketing promotional offers to a customer as in claim 9, wherein said customer-interface further comprises an RFID STR device and wherein said item evaluator further comprises a scale in communication with said customer-interface.

11. A smart cart, comprising:
 a customer-storage-area defined in said smart-cart and used by a customer to store products while shopping, wherein said customer-storage-area comprises an item-evaluator;
 at least one electronic tag reading device configured to retrieve product information from electronic tags associated with products;
 a smart cart computer in communication with said at least one electronic tag reading device and configured to retrieve product information from at least one electronic tag associated with a hot-product wherein said hot-product is at least one of: (a) a product being examined by a customer; or (b) a product in said customer-storage-area;
 wherein said smart cart computer is in communication with said item-evaluator;
 wherein said smart cart computer is further configured to use said item-evaluator to measure a physical parameter of said hot-product placed in said customer-storage area and to compare said measured physical parameter with a known value to verify that said hot-product corresponds to the product identified in said product information;
 wherein said smart cart computer is further configured to communicate with a remote computer and retrieve supplemental-product-information associated with said hot-product using at least part of said product information; and wherein said smart cart computer is further configured to present to said customer at least one member from the group consisting of: (a) at least part of said product information; (b) at least part of said supplemental-product-information; or (c) measured hot-product physical parameter information.

12. A smart cart as in claim 11, wherein said at least one electronic tag reading device is an RFID (radio frequency identification device) STR (smart tag reader) device configured to receive electronic tag transmissions and to transmit an electronic tag trigger signal upon one of an automated computer request generated by said remote computer, an automated computer request generated by said smart cart computer and a manual request generated by said customer.

13. A smart cart as in claim 11, wherein said smart cart computer is further configured to receive real-time cross-marketing promotional offers from said remote computer and present said real-time promotional offers to said customer and wherein said hot-product is a product placed in said customer-storage area.

14. A smart cart as in claim 11, wherein said supplemental-product-information further comprises expected weight information for said hot-product;
 said item-evaluator is a scale;
 said physical parameter is weight; and
 said smart cart computer is configured to verify that the total-measured-weight of hot-products in said customer-storage-area is within a predefined weight-tolerance of the expected-total-weight for said hot-products.

15. A smart cart as in claim 14, wherein said smart cart computer is further configured to communicate with a check-out-computer at a point of sale and wherein said smart cart computer transfers to said check-out-computer at least part of the product information related to the hot-product in said customer-storage-area.

16. A smart cart as in claim 15, wherein at least one of said smart cart computer and said check-out-computer automatically determines the total sales price minus any qualifying cross-marking discounts for said hot-product.

17. A smart cart as in claim 16, wherein at least one of said smart cart computer or said check-out-computer automatically validates a customer check-out by verifying that the total-measured-weight for the hot-product in said customer storage area is within a predefined weight-tolerance of the expected-total-weight for said hot-product.

18. A network enabled smart cart, comprising:
   a customer storage area defined in said smart cart comprising a scale configured in said customer storage area;
   a customer interface;
   at least one electronic tag scanning device associated with said customer interface and configured to receive electronic tag transmissions from electronic tags associated with hot-products;
   a first computer associated with said customer interface;
   wherein said first computer is in communication with said at least one electronic tag scanning device and configured to retrieve product information stored in the electronic tags associated with said hot-products;
   a first network operating in accordance with a predetermined protocol;
   a second network comprising a plurality of said customer interfaces;
   a gateway operatively coupled to said first network and to said second network;
   an HTTP server embedded in one of said gateway and said plurality of customer interfaces; and
   wherein said first computer is configured to establish a communication connection to a third party computer so that a customer can directly communicate with a third party via said customer interface.

19. A network enabled smart cart as in claim 18, wherein said customer interface further comprises at least one of: (a) an LCD (liquid crystal display) display; (b) an audio system for generating and receiving audio messages; (c) a digital camera; (d) a video camera; or (e) a card reader.

20. A network enabled smart cart as in claim 19, wherein said first computer is further configured to execute a Main CMAC (cross-marketing & automatic check-out) routine when a smart cart is present at a point of sale location.

21. A network enabled smart cart as in claim 19, wherein said at least one electronic tag scanning device and said scale are integrated into the same component.

22. A network enabled smart cart as in claim 19, wherein said first computer is in communication with a remote computer and wherein said first computer is further configured to use the product information retrieved from the electronic tags associated with said hot-products to retrieve supplemental-product-information from said remote computer.

23. A network enabled smart cart as in claim 22, wherein said supplemental-product-information includes at least one of the following: (a) hot-product expected-weight information; (b) hot-product pricing information; or (c) promotional offering information associated with the purchase of said hot-product.

24. A network enabled smart cart as in claim 23, wherein said first computer is in communication with said scale and configured to retrieve measured weight information for said hot-products and compare said measured weight with said expected-weight and issue an alert when said measured weight is not within a predefined tolerance of said expected weight.

25. A network enabled smart cart as in claim 24, wherein said first computer is further configured to use said customer interface to present said promotional offering information associated with said hot products to a customer.

26. A network enabled smart cart as in claim 25, wherein said first computer is further configured to automatically determine the pricing information for said hot products and automatically adjust said pricing information consistent with the requirements of accepted promotional offers.

* * * * *

UNITED STATES PATENT AND TRADEMARK OFFICE
CERTIFICATE OF CORRECTION

| | | |
|---|---|---|
| PATENT NO. | : 7,853,477 B2 | Page 1 of 1 |
| APPLICATION NO. | : 10/748763 | |
| DATED | : December 14, 2010 | |
| INVENTOR(S) | : O'Shea et al. | |

It is certified that error appears in the above-identified patent and that said Letters Patent is hereby corrected as shown below:

Page 2, item (56), under "Other Publications", in Column 2, Line 16, delete "www.rfidjournalcom" and insert -- www.rfidjournal.com --.

Page 2, item (56), under "Other Publications", in Column 2, Line 63, delete "www.wincor-nixdor.com" and insert -- www.wincor-nixdorf.com --.

Page 2, item (56), under "Other Publications", in Column 2, Line 64, delete "Idustries" and insert -- Industries --.

Column 18, line 60, in Claim 1, delete "customer-storage area" and insert -- customer-storage-area --.

Column 19, line 14, in Claim 1, delete "real time" and insert -- real-time --.

Column 19, lines 14-15, in Claim 1, delete "real time" and insert -- real-time --.

Column 19, line 19, in Claim 1, delete "customer-storage area" and insert -- customer-storage-area --.

Column 20, line 2, in Claim 11, delete "smart-cart" and insert -- smart cart --.

Column 20, line 20, in Claim 11, delete "customer-storage area" and insert -- customer-storage-area --.

Column 20, line 47, in Claim 13, delete "customer-storage area" and insert -- customer-storage-area --.

Column 22, line 30, in Claim 25, delete "hot products" and insert -- hot-products --.

Column 22, line 33, in Claim 26, delete "hot products" and insert -- hot-products --.

Signed and Sealed this
Seventeenth Day of May, 2011

David J. Kappos
*Director of the United States Patent and Trademark Office*